United States Patent [19]

Deaver et al.

[11] Patent Number: 4,863,213

[45] Date of Patent: Sep. 5, 1989

[54] AERODYNAMIC SPOILER FOR A PICKUP TRUCK AND A METHOD FOR PROVIDING A GENERALLY COMMON CONSTRUCTION FOR A VARIETY OF PICKUP TRUCKS

[76] Inventors: Dann T. Deaver, 20565 Williamsburg Ct., Harper Woods, Mich. 48236; Aris G. Nichols, 923 University, Grosse Pointe, Mich. 48230

[21] Appl. No.: 121,619

[22] Filed: Nov. 17, 1987

[51] Int. Cl.⁴ .............................................. B62D 37/00
[52] U.S. Cl. ................................. 296/180.1; 296/57.1; 29/401.1
[58] Field of Search ............... 296/1 S, 91, 50, 57; 29/401.1

[56] References Cited

U.S. PATENT DOCUMENTS

| | | |
|---|---|---|
| 4,159,843 | 7/1979 | Crossman .............................. 296/91 |
| 4,274,670 | 6/1981 | Pitzmann ............................... 296/91 |
| 4,339,145 | 7/1982 | Bott et al. .............................. 296/91 |
| 4,652,036 | 3/1987 | Okamoto et al. ................... 296/1 S |
| 4,703,970 | 11/1987 | Gorka ................................... 296/1 S |

*Primary Examiner*—Robert R. Song
*Attorney, Agent, or Firm*—Harness, Dickey & Pierce

[57] ABSTRACT

An aerodynamic spoiler adapted to be mounted on the tailgate of a pickup truck to enhance stability under certain driving conditions and to reduce turbulence in the cargo box and further an aerodynamic spoiler having a generally hollow structure and having an open configuration facilitating securing to a mounting surface of a vehicle and a closed configuration after it has been secured and a structure and method of providing common components which can readily accommodate variations in vehicle width with minimal customization required.

39 Claims, 2 Drawing Sheets

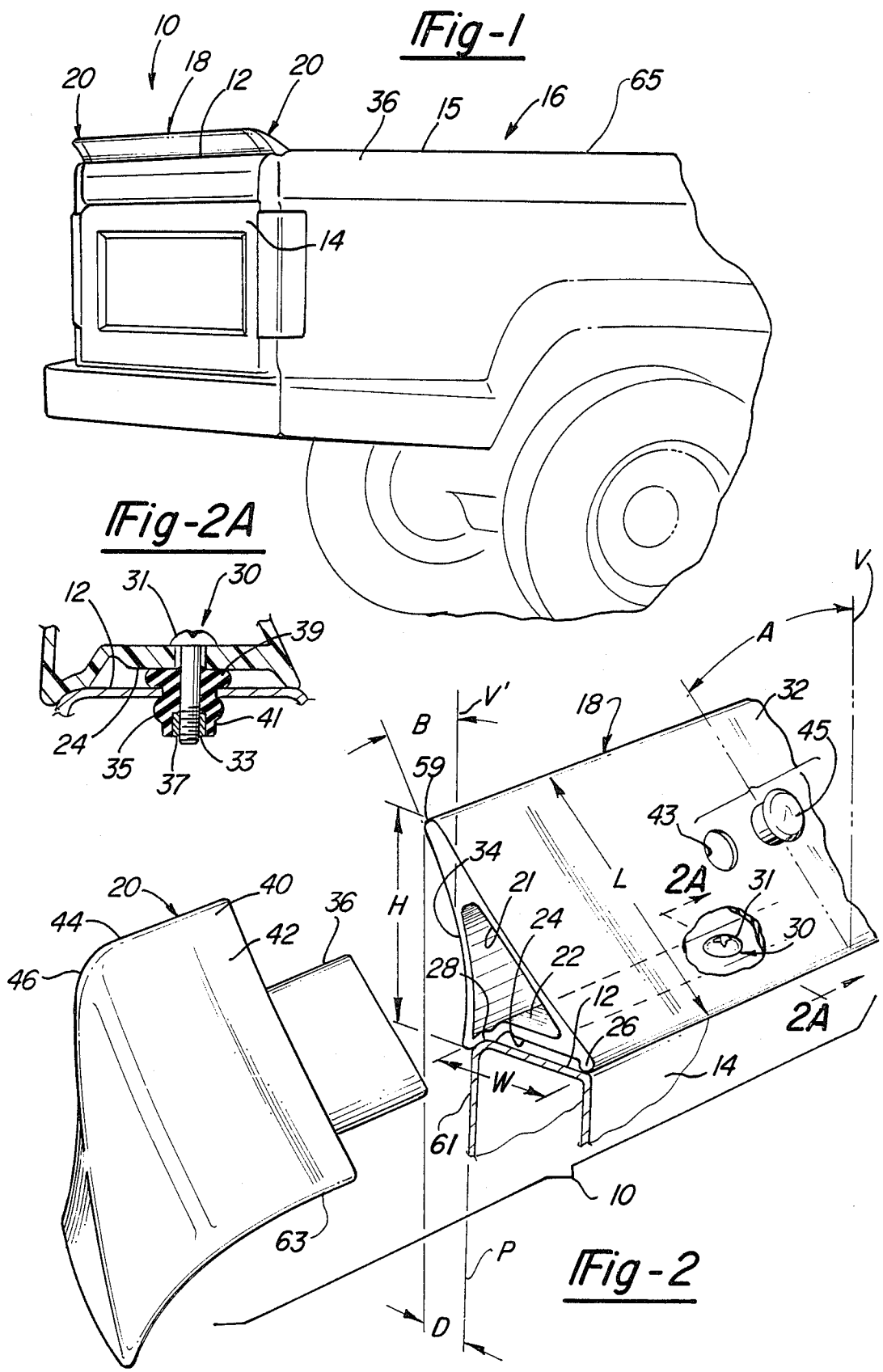

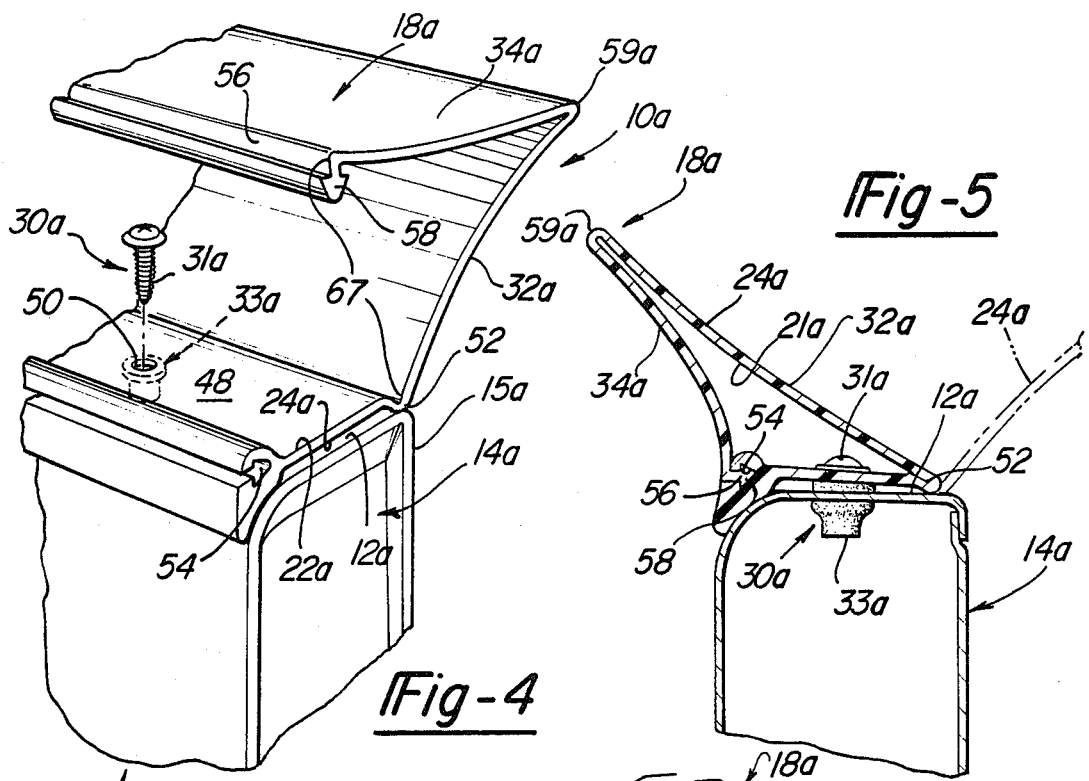
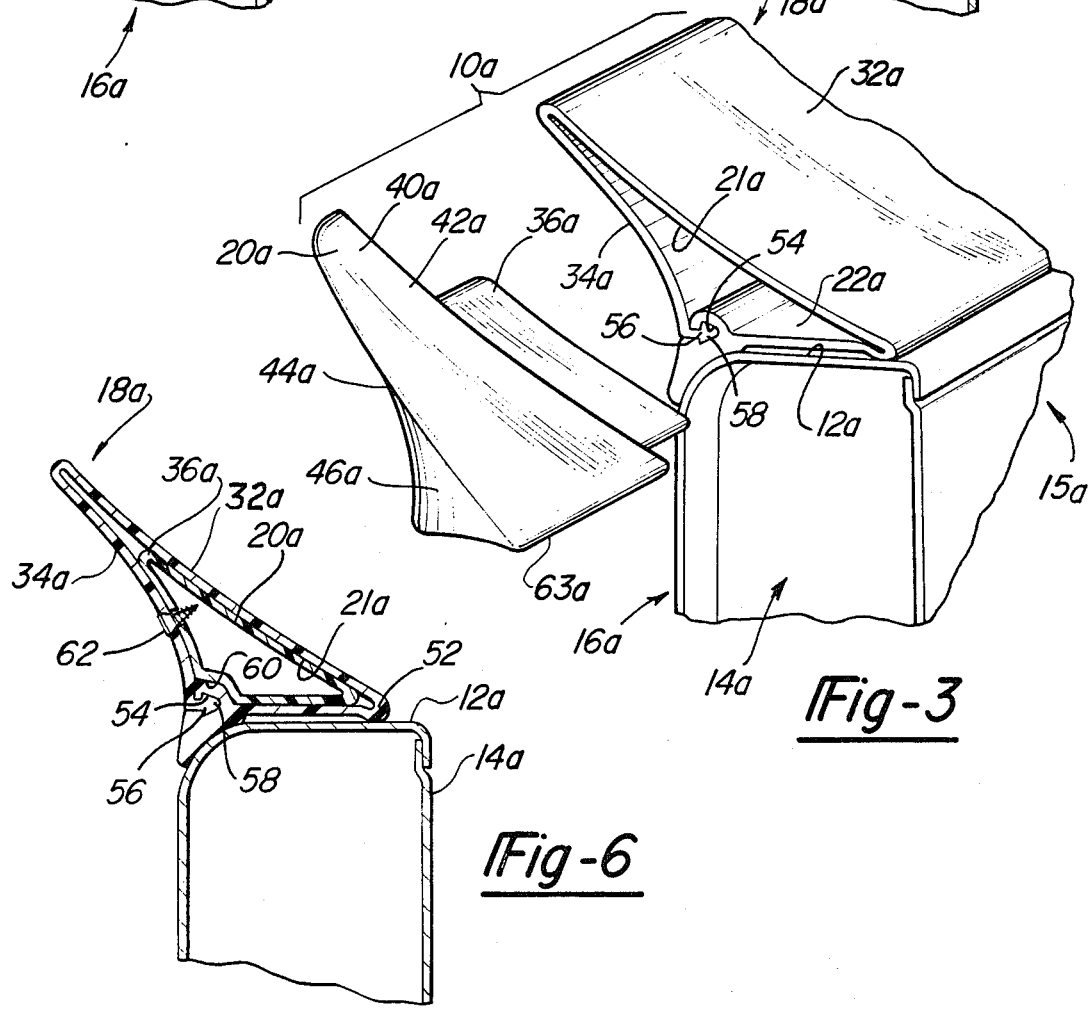

AERODYNAMIC SPOILER FOR A PICKUP TRUCK AND A METHOD FOR PROVIDING A GENERALLY COMMON CONSTRUCTION FOR A VARIETY OF PICKUP TRUCKS

BACKGROUND AND SUMMARY OF THE INVENTION

The present invention relates to an aerodynamic spoiler for a pickup truck and a method for facilitating the provision of such aerodynamic spoilers for pickup trucks of various makes and models and an aerodynamic spoiler having a construction for facilitating mounting to a variety of vehicles.

Aerodynamic wings or spoilers have been used heretofore on numerous vehicles, including race cars and passenger cars, to enhance the stability of the vehicles under certain driving conditions. It has been discovered that the use of a spoiler on the tailgate of a pickup truck not only enhances stability but significantly reduces turbulence in the cargo box behind the vehicle cab. The turbulence results in dirt, dust, etc. from the cargo box being drawn into the cab through its rear window thus routinely requiring the window to be closed when driving. The aerodynamic spoiler of the present invention minimizes such turbulence and permits the vehicle to be driven with the rear window open.

In addition, frequently the vehicle is operated inadvertently or otherwise with the tailgate down; this can result in scraping or marring of the tailgate. The aerodynamic spoiler of the present invention is constructed of a hard, durable plastic that can normally withstand the type of use that would ordinarily damage the tailgate. Thus the use of an aerodynamic spoiler on the tailgate will protect the tailgate from such damage.

The cargo box and tailgate construction of various pickup trucks can vary in size. Thus to provide an aerodynamic spoiler suitable for each make and model of pickup truck would require a significant amount of customization and/or parts inventory resulting in a relatively expensive construction. With the present invention the aerodynamic spoiler is constructed to have a center span member and a pair of end caps. The center span member is of a construction which can be readily extruded from a suitable plastic material into a stock member of a length to provide a plurality of span members; the stock member can thereafter be cut into a number of selective lengths to suit the various makes and models of pickup trucks. End caps, to close the opposite ends of the center span, can be made from a suitable plastic material by injection molding. Thus a large variety of pickup trucks can be accommodated by a common center span extrusion and common injection molded end caps.

The aerodynamic spoiler of the present invention has its center span of a generally closed, hollow triangular configuration. The aerodynamic spoiler is adapted to be secured to the tailgate by fasteners between the tailgate and the base of the center span. In one form of the invention the center span is initially formed to be of an open or generally transversely flat construction whereby the inside surface of the base is exposed. The base can be connected to the remaining structure by a flexible, living hinge formed between two adjacent portions permitting the open structure to be readily converted to its closed triangular configuration by relative movement of the adjacent portions about the hinge. This permits easy access to the base of the center span whereby the center span can be readily attached to the tailgate by fasteners when in the open condition and then closed by pivoting one of the portions about the hinge; the assembly is easily completed by applying the standard end caps at opposite ends of the center span.

Thus it is an object of the present invention to provide a novel aerodynamic spoiler for use on the tailgate of a pickup truck.

It is another object of the present invention to provide a novel aerodynamic spoiler for use on the tailgate of pickup trucks or on the mounting surface of vehicles of various makes and models by utilizing a common center span configuration which can be readily varied in length from a stock member of predetermined excess length and end caps of a uniform, common construction.

It is still another object of the present invention to provide a novel aerodynamic spoiler for use on the tailgate of a pickup truck or on the mounting surface of a vehicle in which the center span is provided to be of an open construction facilitating access to the base for attachment of the center span to the tailgate.

It is still another object of the present invention to provide a novel aerodynamic spoiler for use on the tailgate of a pickup truck or on the mounting surface of a vehicle in which the center span is provided to be of an open construction facilitating access to the base for attachment of the center span to the tailgate with the center span having a hinge construction between adjacent portions permitting closure of the center span after installation.

It is a further object to provide a novel aerodynamic spoiler having an open center span as noted above and further having end caps of a common structure for use in closing opposite ends of the center span and in which the aerodynamic spoiler can be readily adapted for a variety of pickup trucks having cargo boxes and tailgate structures varying in size.

It is another object of the present invention to provide a method for facilitating the provision of aerodynamic spoilers of a generally common construction for various makes and models of pickup trucks and other vehicles.

It is a general object to provide a new and unique aerodynamic spoiler for use on vehicles.

BRIEF DESCRIPTION OF THE DRAWINGS

Other objects, features, and advantages of the present invention will become apparent from the subsequent description and the appended claims, taken in conjunction with the accompanying drawings, in which:

FIG. 1 is a pictorial view of the aerodynamic spoiler of the present invention shown mounted on the tailgate of the cargo box of a pickup truck (only partially shown);

FIG. 2 is an exploded pictorial view of one form of aerodynamic spoiler of the present invention including an associated (right hand) end cap and center span (only partially shown);

FIG. 2A is a fragmentary sectional view of the center span of the spoiler of FIG. 2 taken generally in the direction of the arrows 2A—2A and depicting the means of securement of the spoiler to the tailgate.

FIG. 3 is an exploded pictorial view of a modified form of aerodynamic spoiler having a modified form of center span with the longitudinally extending center span shown in its transversely closed position and mounted on a tailgate of a pickup truck and with its associated (right hand) end cap prior to final assembly;

FIG. 4 is a pictorial view of the modified form of the center span of FIG. 3 having a construction permitting an open or closed configuration and illustrating it in its open configuration for attachment to the tailgate of a pickup truck;

FIG. 5 is a transverse sectional view of the center span of FIG. 3 showing the center span in its closed position with its open position partially shown in phantom; and FIG. 6 is a transverse sectional view of the aerodynamic spoiler of FIG. 3 taken after the end cap has been fully installed into the associated open end of the center span.

DETAILED DESCRIPTION OF THE PREFERRED EMBODIMENTS

Looking now to the drawings an aerodynamic spoiler 10 of the present invention is shown mounted on the upper surface 12 of a tailgate 14 at the back of a cargo box 15 of a pickup truck 16 (partially shown FIG. 1). The spoiler 10 is comprised of a center span 18 and right and left hand end caps 20 which are identical mirror images of each other (see FIGS. 1 and 2).

The center span 18 is a generally hollow structure having a generally triangular shape with a generally triangularly shaped through opening 21. The base 22 of center span 18 has a recessed center portion 24 located between downwardly depending forward and rearward portions 26 and 28, respectively. As stated herein, forward portions, surfaces, etc. are those oriented to face towards the front of the pickup truck 16 while rearward portions, surfaces, etc. are those oriented to face towards the rear of the pickup truck 16. The center span 18 can be secured to the tailgate 14 by a plurality of fastener assemblies 30. The fastener assemblies 30 can be of a type known as a "wellnut" and includes a threaded bolt 31 and an elastic nut member 33. The nut member 33 includes an outerbody 35 and a threaded insert 37. The outerbody 35 has an enlarged head portion 39 and a shank portion 41 and is made of an elastomeric, rubber like material. The insert 37 is molded into the free end of the shank portion 41. In assembly, the shank portion 41 is inserted into an opening through the upper surface 12 of the tailgate 14. The recessed center portion 24 of the center span base 22 will generally accept the head portion 39. The base 22 has an opening adapted to be lined up with the through opening of the nut member 33; as the bolt 31 engages the insert 37 and is tightened, the insert will be moved upwardly to elastically expand the shank portion 41 to form a blind head holding the parts together. At the same time the elastic material will act as a seal to inhibit water from getting into the tailgate 14. The recess of center portion 24 assists in providing a resilient clamp of the center span 18 to the tailgate 14 via the fastener assemblies 30 while the elastomeric outerbody 35 provides resilience to the overall fastening to improve the shock resistance of the assembled aerodynamic spoiler 10.

The center span 18 has an elongated forward leg 32 and a shorter rearward leg 34. The forward leg 32 is provided with an access opening 43 which is in line with the opening in base 22 for the bolt 31 whereby bolt 31 can be inserted for the assembly. A plastic plug 45 can close and seal the access opening 43.

The elongated, forward leg 32 is selected to extend or incline rearwardly at an angle A of between around 40° to around 60° to a vertical line V. The shorter leg 34 can be generally vertical or inclined slightly rearwardly as shown, i.e. at an angle B of between around 15° to around 40° to a vertical line V'. Both could be slightly concave as shown with shorter leg 34. In order to maintain the overall size of the wing 10 to a minimum while still providing the desired aerodynamic effect, the length L of the forward leg 32 was selected to be generally between around 3 inches to around 4 inches and preferably around 3-½ inches; the height or linear length H of short rearward leg 34 was selected to be between around 2-¼ inches to around 3-¼ inches and preferably around 2-¾ inches. The overall width W of the base 22 would generally be dictated in part by the width of the upper surface 12, and the desired angles A and B and the lengths L and H of legs 32 and 34 or, between around 1¾ inches to around 2-¼ inches. Note that the upper extremity 59 of forward leg 32 extends rearwardly a distance D beyond the generally vertical plane P of the rearward surface 61 of tailgate 14. Preferably the upper extremity 59 is located a distance D of at least around ½ inches.

The end caps 20 are adapted to close the opposite open ends of the center span 18. Thus the right hand end cap 20 (FIG. 2) is of a generally hollow construction and has a plug portion 36 which is of a contour generally similar to that of the triangular opening 21. Thus the plug portions 36 of end caps 20 will be snugly, matably received within the opposite open ends 21 of center span 18 to properly position the end caps 20. The end caps 20 can be secured therein with a suitable adhesive or a threaded fastener (not shown) adapted to engage the plug portion 36 through a suitable opening in the recessed center portion 24. Where the threaded fastener is used the end caps 20 will be assembled to the center span 18 before the spoiler 10 is assembled to the tailgate upper surface 12 via the fasteners 30.

The outer body portion 40 of the end cap 20 has a forward surface 42 of a contour similar to that of center span forward surface 32 and has a rearward surface 44 of a contour similar to that of center span rearward surface 34. The extreme end surface 46 of the outer body portion 40 is generally arcuately, inwardly tapered from its lower extremity to its upper extremity.

The center span 18 is a substantially uniform construction over its length and can be of a longitudinal length equal to the width of the tailgate 14. The end caps 20 will extend outwardly beyond the opposite longitudinal ends of the tailgate 14 and thereby provide the wing 10 with an overall length substantially equal to the width of the cargo box 15. In this way substantially all of the interior of the cargo box 15 will be shielded from turbulence by the aerodynamic effect of the wing 10. The bottom surface 63 of end caps 20 will be slightly above the tailgate engaging surfaces of the base 22 to provide clearance with the upper surfaces of the stationary side walls 65 of the cargo box 15 when the tailgate 14 is moved between its open and closed positions.

The center span 18 is preferably made from extruded plastic stock members of a predetermined excess length which can then be cut into pieces of various lengths to form pluralities of center spans 18 to accommodate the variations in widths of tailgates, cargo boxes, etc. of different makes and models of pickup trucks. At the same time common end caps 20 can be made by injection molding from plastic. Thus it can be seen that common tooling can be used to manufacture aerodynamic spoilers 10 of different overall lengths longitudinally to accommodate different pickup trucks. Both the center span 18 and end caps 20 can be made from suitable plastics such as polyethylene and polypropylene and in desired colors obviating the need for painting and hence providing in a sense, a rugged structure that will not readily be scratched, marred, etc. Thus the aerodynamic spoiler 10 not only provides the benefits of enhanced stability and handling of the pickup truck 16 under certain driving conditions and of minimizng turbulence in the cargo box 15 but it also serves to protect the upper surface 12 of the tailgate 14 from damage, i.e. as when the tailgate is lowered for loading etc., or elongated members are carried in the cargo box 15 that would normally rest on the upper surface 12. In addition the minimal overall size of the aerodynamic spoiler 10 permits its use without interference with the routine use of the cargo box 15 and/or the tailgate 14. In some applications it might be desirable to paint the aerodynamic spoiler 10; in this case the components could be made from a polyphenylene oxide (PPO) or a blend of polyphenolene butelyne teratthalate (PBT) and polycarbonate (PC).

A modified form of aerodynamic spoiler is depicted in FIGS. 3-6 in which components similar to like components in the embodiment of FIGS. 1-2 are given the same numerical designation with the addition of the letter postscript "a". Thus aerodynamic spoiler 10a is shown mounted on the upper surface 12a of tailgate 14a at the back of cargo box 15a of pickup truck 16a (FIGS. 3-6). Again spoiler 10a has a center span 18a and right and left hand end caps 20a which are identical mirror images of each other.

The center span 18a is formed as a generally flat open structure, which it will be seen can be transversely folded into a closed, generally triangularly shaped hollow structure. Thus the center span 18a will have a generally open configuration as shown in FIG. 4 and a closed configuration as shown in FIGS. 3, 5 and 6.

The base 22a of center span 18a can be formed to be generally flat and with the center span 18a in the open configuration the inner surface 48 of base 22a is accessible for installation purposes. To this end a plurality of spaced holes 50 are formed in the base 22a and a plurality of fastener assemblies 30a including bolts 31a and elastic nut members 33a can be used to readily secure the base 22a and hence the center span 18a to the upper surface 12a of the tailgate 14a. Base 22a has a recess structure 24a similar to base 22 for the reasons previously noted.

The center span 18a has an elongated forward leg 32a and a shorter rearward leg 34a which are connected together at the upper end 59a to define a generally V-shaped upper section 67. At the same time the forward leg 32a is connected to the base 22a by a reduced section portion defining a flexible or living hinge 52; thus the forward leg 32a and rearward leg 34a can be pivoted together relative to the base 22a via the flexible hinge 52. The base 22a has a forwardly facing socket or groove 54 extending longitudinally over its length at its forward end. The free end of the rearward leg 34a has a tongue or projection 56 which is adapted to be matingly received within the groove 54. In this regard the projection 56 has an enlarged head portion 58 which will be captured within the groove 54 which closes on itself to firmly hold the head portion 58. As can be seen the center span 18a is of a structure which significantly simplifies the installation of the aerodynamic wing 10a. The generally triangular configuration of the center span 18a in its closed position (FIGS. 3, 5 and 6) with triangular opening 21a is generally the same as that of the center span 18 of the embodiment of FIGS. 1-3 and the angular and dimensional characteristics noted for center span 18 generally apply to center span 18a as well, i.e. angles A and B, and dimensions L, H, W and D would apply.

End caps 20a are also similar to end caps 20 and surfaces 42a and 44a are similar to and as described with reference to surfaces 42, and 44. End surface 46a, however, does not curve as far down as end surface 46. Each end cap 20a has a plug portion 36a extending from an outer body portion 40a. Here end cap 20a while having its plug portion 36a triangularly shaped to mate within the opening 21a also has an arcuate recess 60 adapted to receive the socket 54 to hold it from deflecting to an open position; hence the recess 60 in acting on the socket 54 will lock the head portion 58 within the socket 54 (see FIG. 6). In this regard the end cap 20a and the plug portion 36a can be generally hollow as shown. The end caps 20a can be secured to the center span 18a via self tapping screws 62.

As with the center span 18, center span 18a can be formed from stock members extruded to a predetermined excess length which can be cut up into smaller varying lengths to form pluralities of center spans 18a to suit various makes and models of pickup trucks and other vehicles. Also the end caps 20a (as with end caps 20) can be made by injection molding. Both center span 18a and end caps 20a can be made from the plastic materials previously noted with regard to the aerodynamic spoiler 10. However, it is believed advantageous to construct the center span 18a from a thermal plastic rubber (TPR) material. The end caps 20a can also be constructed of this material. The flexible nature of the TPR material is resilient and has good shock resistance and also lends itself to painting to match the color of the associated pickup truck 16a. The flexible nature of the TPR material also allows the center span 18a of the spoiler 10a to more readily conform to mounting surfaces of different configurations for different vehicles.

While it will be apparent that the preferred embodiment of the invention disclosed are well calculated to fulfill the objects above stated, it will be appreciated that the invention is susceptible to modification, variation and change without departing from the proper scope or fair meaning of the invention.

What is claimed is:

1. In a pickup truck having a open cargo box, the invention comprising:
   a tailgate at the rear of the cargo box and having an upper surface,
   an aerodynamic spoiler having a base supported on said upper surface of said tailgate,
   said aerodynamic spoiler having an elongated leg having one end connected at the forward end of said base and being inclined upwardly, rearwardly from said forward end of said base.

2. The invention of claim 1 in which the angle of inclination of said elongated leg relative to a vertical plane is between around 40° to around 60°.

3. The invention of claim 1 in which said elongated leg has a length of generally between around 3 inches to around 4 inches.

4. The invention of claim 1 in which the angle of inclination of said elongated leg relative to a vertical plane is between around 40° to around 60° and in which said elongated leg has a length of generally between around 3 inches to around 4 inches.

5. The invention of claim 1 with said aerodynamic spoiler including a generally hollow center span and a pair of end caps generally closing opposite ends of said center span.

6. The invention of claim 1 with said aerodynamic spoiler including a generally hollow center span and a pair of end caps generally closing opposite ends of said center span,
said center span being constructed from stock members of predetermined excess length which are cut-up to provide pluralities of said center span of variable lengths to accommodate variations in different makes and models of pickup trucks.

7. The invention of claim 1 with the upper termination of said elongated leg being at least around 0.5 inches past the vertical plane of the rear surface of said tailgate.

8. The invention of claim 1 with said aerodynamic spoiler including a generally hollow center span and a pair of end caps generally closing opposite ends of said center span,
said opposite ends of said center span defining openings of a predetermined shape, said end caps having plug portions adapted to be matably received within said openings to properly position said end caps relative to said center span.

9. The invention of claim 1 with said aerodynamic spoiler including a generally hollow center span and a pair of end caps generally closing opposite ends of said center span,
said opposite ends of said center span defining openings of a predetermined shape, said end caps having plug portions adapted to be matably received wihin said openings to properly position said end caps relative to said center span,
said center span having a forward surface portion defined by said elongated leg and having a rearward surface portion defined by a shorter rearward leg,
said end caps having said plug portions extending from outer body portions, said outer body portions havng forward and rearward cap surface portions adapted to be located adjacent to said forward and rearward span surface portions with said forward and rearward cap surface portions being contoured similarly to said forward and rearward span surface portions.

10. In a vehicle having a mounting surface for an aerodynamic spoiler, the invention comprising:
an aerodynamic spoiler having a base adapted to be supported on the mounting surface of the vehicle,
said aerodynamic spoiler having an elongated leg having one end connected at the forward end of said base and being inclined upwardly, rearwardly from said forward end of said base,
said aerodynamic spoiler including a generally hollow center span and a pair of end caps generally closing opposite ends of said center span,
said center span having a preassembled generally open configuration, said center span having an upper section including said elongated leg,
hinge means connecting one end of said upper section to a first end of said base for pivotal movement of said upper section to a closed configuration.

11. The invention of claim 10 in which the angle of inclination of said elongated leg relative to a vertical plane is between around 40° to around 60°.

12. The invention of claim 10 in which said elongated leg has a length of generally between around 3 inches to around 4 inches.

13. The invention of claim 10 in which the angle of inclination of said elongated leg relative to a vertical plane is between around 40° to around 60° and in which said elongated leg has a length of generally between around 3 inches to around 4 inches.

14. The invention of claim 10 with said aerodynamic spoiler including:
first connecting means at the other end of said upper section,
second connecting means at the opposite end of said base from said first end,
said first and second connecting means selectively operable for connecting said upper section with said base for placing said center span in said closed configuration,
securing means for securing said base to the mounting surface of the vehicle when said center span is in said open configuration.

15. The invention of claim 10 with said aerodynamic spoiler including:
first connecting means at the other end of said upper section;
second connecting means at the opposite end of said base from said first end,
said first and second connecting means selectively operable for connecting said upper section with said base for placing said center span in said closed configuration,
securing means for securing said base to the mounting surface of the vehicle when said center span is in said open configuration,
said opposite ends of said center span defining openings of a predetermined shape when said center span is in said closed configuration, said end caps having plug portions adapted to be matably received within said openings to properly position said end caps relative to said center span.

16. The invention of claim 10 with said aerodynamic spoiler including:
first connecting means at the other end of said upper section,
second connecting means at the opposite end of said base from said first end,
said first and second connecting means selectively operable for connecting said upper section with said base for placing said center span in said closed configuration,
securing means for securing said base to the mounting surface of the vehicle when said center span is in said open configuration,
said opposite ends of said center span defining openings of a predetermined shape when said center span is in said closed configuration, said end caps having plug portions adapted to be matably received within said openings to properly position said end caps relative to said center span,
lock means in said plug portions for locking the connection between said first and second connecting means.

17. The invention of claim 10 with said aerodynamic spoiler including:

first connecting means at the other end of said upper section, second connecting means at the opposite end of said base from said first end, said first and second connecting means selectively operable for connecting said upper section with said base for placing said center span in said closed configuration, securing means for securing said base to the mounting surface of the vehicle when said center span is in said open configuration, said first and second connecting means including a socket and an enlarged head adapted to be captured in said socket for connecting said upper section and said base.

18. The invention of claim 10 with said aerodynamic spoiler including:

first connecting means at the other end of said upper section, second connecting means at the opposite end of said base from said first end, said first and second connecting means selectively operable for connecting said upper section with said base for placing said center span in said closed configuration, securing means for securing said base to the mounting surface of the vehicle when said center span is in said open configuration, said first and second connecting means including a socket and an enlarged head adapted to be captured in said socket for connecting said upper section and said base, said opposite ends of said center span defining openings of a predetermined shape when said center span is in said closed configuration, said end caps having plug portions adapted to be matably received within said openings to properly position said end caps relative to said center span.

19. The invention of claim 10 with said aerodynamic spoiler including:

first connecting means at the other end of said upper section, second connecting means at the opposite end of said base from said first end, said first and second connecting means selectively operable for connecting said upper section with said base for placing said center span in said closed configuration, securing means for securing said base to the mounting surface of the vehicle when said center span is in said open configuration, said first and second connecting means including a socket and an enlarged head adapted to be captured in said socket for connecting said upper section and said base, said opposite ends of said center span defining openings of a predetermined shape when said center span is in said closed configuration, said end caps having plug portions adapted to be matably received within said openings to properly position said end caps relative to said center span, lock means in said plug portions for locking the connection between said first and second connecting means.

20. The invention of claim 10 with said aerodynamic spoiler including:

first connecting means at the other end of said upper section, second connecting means at the opposite end of said base from said first end, said first and second connecting means selectively operable for connecting said upper section with said base for placing said center span in said closed configuration, securing means for securing said base to the mounting surface of the vehicle when said center span is in said open configuration, said first and second connecting means including a socket and an enlarged head adapted to be captured in said socket for connecting said upper section and said base, said opposite ends of said center span defining openings of a predetermined shape when said center span is in said closed configuration, said end caps having plug portions adapted to be matably received within said openings to properly position said end caps relative to said center span, said first connecting means including said enlarged head, said second connecting means including said socket, lock means including a recess in said plug portion for overengaging said socket for locking said enlarged head in said socket.

21. The invention of claim 10 with said aerodynamic spoiler including:

first connecting means at the other end of said upper section, second connecting means at the opposite end of said base from said first end, said first and second connecting means selectively operable for connecting said upper section with said base for placing said center span in said closed configuration, securing means for securing said base to the mounting surface of the vehicle when said center span is in said open configuration, said first and second connecting means including a socket and an enlarged head adapted to be captured in said socket for connecting said upper section and said base, said opposite ends of said center span defining openings of a predetermined shape when said center span is in said closed configuration, said end caps having plug portions adapted to be matably received within said openings to properly position said end caps relative to said center span, said first connecting means including said enlarged head, said second connecting means including said socket, lock means including a recess in said plug portion for overengaging said socket for locking said enlarged head in said socket, said hinge means connecting said elongated leg to said base.

22. The invention of claim 10 with said center span being generally triangularly shaped and having a short leg connected between the other end of said elongated leg and the rearward end of said base portion.

23. The invention of claim 10 with said center span being generally triangularly shaped and having a short leg connected between the other end of said elongated leg and the rearward end of said base portion, the angle of inclination of said elongated leg relative to a vertical plane is between around 40° to around 60° and in which said elongated leg has a length of generally between around 3 inches to around 4 inches,
said short leg having a length generally of between around 2-¼ inches to around 3-¼ inches,
said short leg inclining rearwardly and upwardly at an angle of between around 15° to around 40° relative to a vertical plane.

24. The invention of claim 10 with said aerodynamic spoiler including:
said center span being generally triangularly shaped and having a short leg connected between the other end of said elongated leg and the rearward end of said base portion,
the angle of inclination of said elongated leg relative to a vertical plane is between around 40° to around 60° and in which said elongated leg has a length of generally between around 3 inches to around 4 inches,
said short leg having a length generally of between around 2-¼ inches to around 3-¼ inches,
said short leg inclining rearwardly and upwardly at an angle of between around 15° to around 40° relative to a vertical plane,
said opposite ends of said center span defining openings of a predetermined shape, said end caps having plug portions adapted to be matably received within said openings to properly position said end caps relative to said center span,
said openings of said center span being generally triangularly shaped, and
said plug portions being generally triangularly shaped similar to said openings.

25. In a vehicle having a mounting surface for an aerodynamic spoiler the invention comprising:
an aerodynamic spoiler having a base adapted to be supported on the mounting surface of the vehicle,
said aerodynamic spoiler having an elongated leg having one end connected at the forward end of said base portion and being inclined upwardly, rearwardly from said forward end of said base,
said aerodynamic spoiler including a generally hollow center span and a pair of end caps generally closing opposite ends of said center span,
said center span having a presassembled generally open configuration an an assembled closed configuration, said center span having an upper section including said elongated leg,
said base having an interior surface located interiorly of said center span when said center span is in said closed configuration,
span connection means selectively connecting said upper section to said base and permitting movement of said upper section between said open and closed configurations,
securing means for securing said base to the mounting surface of the vehicle through said interior surface of said base when said center span is in said open configuration.

26. The invention of claim 25 with said span connection means including first connection means for connecting one end of said upper section to a first end of said base,
said span connection means including second connection means for connecting the other end of said upper section to the end of said base opposite from said first end,
said first and second connecting means selectively operable for connecting said upper section with said base for placing said center span in said closed configuration from said open configuration.

27. The invention of claim 25 with said span connection means including hinge means for connecting said upper section to said base for pivotal movement between said open and closed configurations.

28. The invention of claim 25 with said span connection means including hinge means for connecting said upper section to said base for pivotal movement between said open and closed configurations,
said span connection means including latch means for holding said upper section to said base when in said closed configuration.

29. The invention of claim 25 with said span connection means including hinge means for connecting said upper section to said base for pivotal movement between said open and closed configurations,
said span connection means including latch means for holding said upper section to said base when in said closed configuration,
and lock means operatively associated with said latch means for locking said upper section and said base in said closed configuration.

30. In a vehicle having a mounting surface for an aerodynamic spoiler, the invention comprising:
an aerodynamic spoiler having a base adapted to be supported on the mounting surface of the vehicle,
said aerodynamic spoiler having an elongated leg having one end connected at the forward end of said base and being inclined upwardly, rearwardly from said forward end of said base,
said aerodynamic spoiler including a generally hollow center span and a pair of end caps generally closing opposite ends of said center span,
said center span having a preassembled generally open configuration, said center span having an upper section including said elongated leg,
span connection means selectively connecting said upper section to said base and permitting movement of said upper section between said open and closed configurations,
said span connection means including first connection means for connecting one end of said upper section to a first end of said base,
second connecting means for connecting the other end of said upper section to the end of said base opposite from said first end,
said first and second connecting means selectively operable for connecting said upper section with said base for placing said center span in said closed configuration from said open configuration,
said base having an interior surface located interiorly of said center span when in said closed configuration,
securing means for securing said base through said interior surface to the mounting surface of the vehicle when said center span is in said open configuration,
said opposite ends of said center span defining openings of a predetermined shape when said center span is in said closed configuration, said end caps having plug portions adapted to be matably received within said openings to properly position said end caps relative to said center span,
lock means in said plug portions for locking the connection between said first and second connecting means.

31. In a vehicle having a mounting surface, the method of providing an aerodynamic spoiler for a variety of makes and models of vehicles having mounting surfaces of varying lengths, the invention comprising the steps of:

providing an aerodynamic spoiler having a base adapted to be supported on the mounting surface of the vehicle, said aerodynamic spoiler including a generally hollow center span and a pair of end caps generally closing opposite ends of said center span, said aerodynamic spoiler having an elongated leg having one end connected at the forward end of said base and being inclined upwardly, rearwardly from said forward end of said base, forming stock members of a preselected length having the configuration of said hollow center span, cutting said stock members into pluralities of center spans of varying lengths for the varying lengths of mounting surface of the variety of makes and models of vehicles, forming said pair of end caps of a generally uniform structure, fixing said end caps to said opposite ends of said center span.

32. The method of claim 31 in which said center span is formed with the angle of inclination of said elongated leg relative to a vertical plane being between around 40° to around 60°.

33. The method of claim 31 in which said center span is formed with said elongated leg having a length of generally between around 3 inches to around 4 inches.

34. The method of claim 31 in which said center span is formed by extrusion from a plastic material.

35. The method of claim 34 in which said end caps are formed by injection molding from a suitable plastic material.

36. The method of claim 31 in which said center span is formed by extrusion from a thermal plastic rubber material.

37. The method of claim 36 in which said end caps are formed by injection molding from a thermal plastic rubber material.

38. In a vehicle having a mounting surface, the method of providing an aerodynamic spoiler for mounting on the mounting surface, the invention comprising the steps of:

forming an aerodynamic spoiler having a base adapted to be supported on the mounting surface of the vehicle, said aerodynamic spoiler including a generally hollow center span and a pair of end caps generally closing opposite ends of said center span, said center span having a preassembled generally open configuration and an assembled closed configuration, said center span includes said base with said base having an inside surface which is located interiorly of said center span in said closed configuration and is fully accessible in said open configuration, said center span having an upper section with an elongated leg being inclined upwardly, rearwardly from said forward end of said base when said center span is in said closed configuration, said center span having connecting means selectively connecting said upper section to said base for permitting movement of said upper section between said open and closed configurations, securing said base through said inside surface to the mounting surface of the vehicle said center span is in said open configuration and operating on said connecting means for placing said center span in said closed configuration.

39. The invention of claim 38 comprising the steps of:

assembling said end caps to be supported within said opposite ends of said center span with said end caps locking said upper section to said base in said closed configuration.

* * * * *

UNITED STATES PATENT AND TRADEMARK OFFICE
CERTIFICATE OF CORRECTION

PATENT NO. : 4,863,213

DATED : September 5, 1989

INVENTOR(S) : Dann T. Deaver and Aris G. Nichols

It is certified that error appears in the above-identified patent and that said Letters Patent is hereby corrected as shown below:

Col. 7, line 46, Claim 9, delete "havng" and substitute therefor --having--

Col. 11, line 45, Claim 25, delete "an" first occurrence and substitute therefor --and--

Col. 14, line 30, Claim 38, after "vehicle" insert --while--.

Signed and Sealed this

Fourteenth Day of August, 1990

Attest:

HARRY F. MANBECK, JR.

*Attesting Officer*  *Commissioner of Patents and Trademarks*